United States Patent [19]

Ueyama

[11] Patent Number: 5,530,790
[45] Date of Patent: Jun. 25, 1996

[54] PRINT CONTROL DEVICE FOR A PRINTER OR SIMILAR EQUIPMENT

[75] Inventor: Shuziro Ueyama, Tokyo, Japan

[73] Assignee: NEC Corporation, Tokyo, Japan

[21] Appl. No.: 989,693

[22] Filed: Dec. 14, 1992

[30] Foreign Application Priority Data

Dec. 13, 1991 [JP] Japan ............................. 3-352318

[51] Int. Cl.[6] ............................................. G06K 15/00
[52] U.S. Cl. ........................ 395/102; 395/105; 395/113
[58] Field of Search ............................. 395/102, 116, 395/117, 115, 146, 112, 105, 106; 400/76; 364/519; 358/296

[56] References Cited

U.S. PATENT DOCUMENTS

| | | | |
|---|---|---|---|
| 4,916,638 | 4/1990 | Haselby et al. | 395/1.5 |
| 4,965,749 | 10/1990 | Straayer | 395/105 |
| 4,996,650 | 2/1991 | Kenbo | 395/105 |
| 5,047,956 | 9/1991 | Hirami et al. | 364/519 |
| 5,069,556 | 12/1991 | Sasaki et al. | 395/105 |
| 5,100,248 | 3/1992 | Cripe | 400/76 |
| 5,101,473 | 3/1992 | Kotaki | 395/105 |
| 5,113,488 | 5/1992 | Bisclet et al. | 395/112 |
| 5,115,493 | 5/1992 | Jeanblanc et al. | 395/117 |
| 5,121,471 | 6/1992 | Nam | 395/115 |
| 5,129,047 | 7/1992 | Cha | 395/1.5 |
| 5,129,053 | 7/1992 | Makihara | 395/117 |
| 5,146,545 | 9/1992 | Maruyama | 395/115 |
| 5,189,731 | 2/1993 | Sakamoto et al. | 395/146 |
| 5,223,939 | 6/1993 | Imaizumi et al. | 395/117 |
| 5,249,060 | 9/1993 | Ishikawa | 358/296 |
| 5,408,591 | 4/1995 | Shih et al. | 395/105 |

*Primary Examiner*—Raymond J. Bayerl
*Assistant Examiner*—Steven P. Sax
*Attorney, Agent, or Firm*—Sughrue, Mion, Zinn, Macpeak & Seas

[57] ABSTRACT

A print control device applicable to a printer or similar equipment and capable of maintaining the absolute printing amount of a cut sheet constant with no regard to the thickness and hardness of the sheet. A work RAM (Random Access Memory) stores various kinds of data and sheet size parameters received via an interface control. The work RAM has a line feed counter for counting the lines fed from the leading edge of a sheet in absolute value, and a sheet end counter for counting the lines fed after the end of the sheet has been detected. A CPU (Central Processing Unit) controls the printer in conformity to the programs stored in a control ROM (Read Only Memory) and determines the last line to be printed on the basis of the sheet size parameters and the outputs of the two counters of the work RAM.

2 Claims, 8 Drawing Sheets

| NO. | KIND OF SHEET | SHEET LENGTH | IN TERMS OF 1/360" | DIFFERENCE | |
|---|---|---|---|---|---|
| 1 | A3 VERTICAL | 420mm | 5953 | 1-2 | 56mm |
| 2 | B4 VERTICAL | 364mm | 5159 | 2-3 | 67mm |
| 3 | A4 VERTICAL & A3 HORIZONTAL | 297mm | 4209 | 3-4 | 40mm |
| 4 | B5 VERTICAL & B4 HORIZONTAL | 257mm | 3643 | 4-5 | 47mm |
| 5 | A5 VERTICAL & A4 HORIZONTAL | 210 mm | 2976 | 5-6 | 28mm |
| 6 | B5 HORIZONTAL | 182mm | 2580 | 6-7 | 34mm |
| 7 | POSTCARD VERTICAL & A5 HORIZONTAL | 148mm | 2098 | 7-8 | 48mm |
| 8 | POSTCARD HORIZONTAL | 100mm | 1417 | | |

PRINT CONTROL DEVICE FOR A PRINTER OR SIMILAR EQUIPMENT

BACKGROUND OF THE INVENTION

The present invention relates to a print control device for a printer, typewriter or similar equipment and, more particularly, to a print control device capable of maintaining the absolute printing amount constant.

Generally, a printer, typewriter or similar equipment includes a sheet transport arrangement for feeding a sheet to a platen, and a sheet sensor for determining a condition in which the sheet is transported. The sheet sensor may be implemented by a mechanical switch having a lever to be operated by a sheet being transported. Alternatively, the sheet sensor may be comprised of a transmission type or a reflection type sensor having a light emitting element and a light-sensitive element. The transmission type sensor determines that a sheet is present when light issuing from the light emitting element toward the light-sensitive element is intercepted by the sheet, while the reflection type sensor determines so when light issuing from the light emitting element is reflected by the sheet onto the light-sensitive element. Further, the presence of a sheet at the time of sheet insertion and the absence of a sheet after printing may be determined by a single switch or by independent switches as desired. It is a common practice to feed, after the insertion of a sheet has been detected, the sheet to a position where the first line is to be printed, print data on the sheet, and then allow data to be printed even after the end of the sheet has been detected, i.e., from the position where the end of the sheet has been detected to the trailing edge of the sheet. For this purpose, the lines fed from the sheet detection position to the trailing edge of the sheet are counted and then compared with the absolute amount of line feed from the sheet detection position to the trailing edge of the sheet which is determined beforehand. Printing is allowed until the count reaches the absolute amount of line feed. This prevents data to be printed after a sheet has moved away from a print head and allows data to be printed up to the trailing edge of a sheet even after the end of sheet has been detected.

The problem with the conventional print control device is that the time when the end of a sheet is detected is apt to fluctuate depending on the color, thickness and hardness of a sheet to be used and due to a change in the speed of a sheet passing the sheet sensor. In the light of this, it has been customary to regulate the transport of a sheet for a moment by a feed roller after the sheet has moved away from the sheet sensor, and then feed the sheet again by the feed roller. As a result, although the sheet sensor does not need high accuracy regarding the feed of a sheet to the first line printing position, the change in the time when a sheet detection signal appears has influence on the absolute printing amount in the direction of lines of a sheet. Hence, if the accuracy of end-of-sheet detection is low, the absolute printing amount changes in the direction of lines.

Moreover, the sheet sensor of the type using a light emitting element and a light-sensitive element noticeably changes the output level thereof due to the aging of the elements and depending on the color of a sheet, distance to a sheet, etc. This causes the time when an end-of-sheet signal actually appears to deviate from the time when it should appear. Although the mechanical switch is inexpensive, the ON/OFF response thereof greatly changes due to the mechanical operation. In addition, the mechanical operation brings about chattering with the result that the time when the switch should generate a signal is delayed.

The deviation of the time when the switch detects a sheet from the time when the sheet is fed gives rise to the following problem. Since print data and line feed commands from a host CPU (Central Processing Unit) are not uniform, the time when an end-of-sheet signal appears apparently differs from, for example, the case wherein a sheet is once brought to a stop in the vicinity of the switch and then moved away from the switch to the case wherein it is continuously moved away from the switch at high speed. This problem becomes more serious as the sheet feed speed increases. Specifically, assume that a printing amount from the position where the end of a sheet is detected to the trailing edge of the sheet is determined with the above-mentioned position used as a reference. Then, the deviation of the time when an end-of-sheet signal appears changes the absolute number of lines which can be printed on a sheet and changes the distance between the last printing line to the trailing edge of the sheet.

SUMMARY OF THE INVENTION

It is, therefore, an object of the present invention to provide a print control device for a printer or similar equipment capable of maintaining the absolute printing amount of a cut sheet constant by detecting the last printing line of a sheet.

In accordance with the present invention, in a printer which prints data on a sheet with a print head and comprises a host CPU, an interface control for controlling the reception of data sent from the host CPU, a control ROM (Read Only Memory) storing programs for controlling the printer, a head driver for driving the print head, a spacing motor driver for driving a spacing motor for feeding the sheet, a line feed motor driver for driving a line feed motor for feeding a line, a switch for sensing the sheet, and an input/output control for controlling the output of signals to the drivers and the input of signals from the switch; a print control device comprises a work RAM (Random Access Memory) for storing various kinds of data and sheet size parameters received via the interface control. The work RAM has a line feed counter for counting the absolute value of lines fed from the leading edge of the sheet to produce a line feed count, and a sheet end counter for counting lines fed after the end of the sheet has been detected to produce a sheet end count. A CPU calculates the last printing line of the sheet on the basis of the sheet size parameters, the line feed count and the sheet end count while controlling the printer according to the programs stored in the control ROM.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 6:
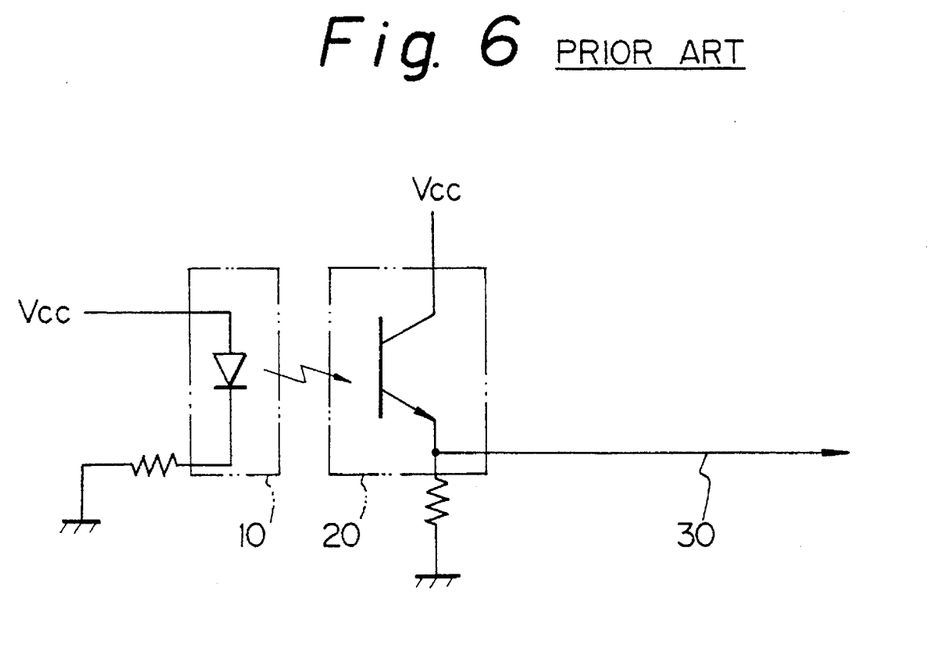
FIG. 6 shows a transmission type sensor which is a specify form of a conventional sheet sensor.
Figure 7:
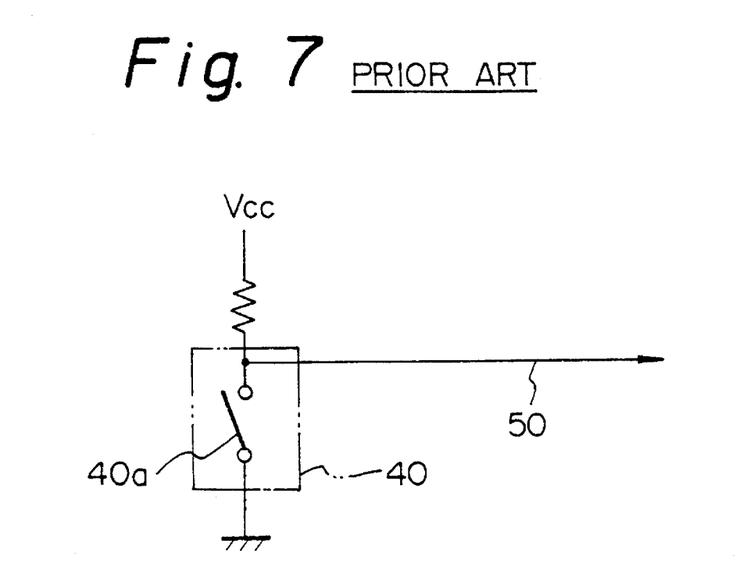
FIG. 7 shows a mechanical switch which is another specific form of a conventional sheet sensor.

FIG. 6 shows a conventional sheet sensor incorporated in, for example, a printer and implemented by a transmission type or a reflection type sensor switch. FIG. 7 shows another conventional sheet sensor which is implemented by a mechanical switch. As shown in FIG. 6, the switch has a light emitting element 10 and a light-sensitive element 20 which are disposed on a sheet transport path. Specifically, in the case of a transmission type sensor switch, the two elements 10 and 20 are located to face each other with the intermediary of a sheet transport path. In the case of a reflection type sensor switch, the elements 10 and 20 are juxtaposed to each other along a sheet transport path and inclined a predetermined angle to each other, so that light issuing from the element 10 may be reflected from a sheet onto the element 120. When the sensor switch, whether it be of the transmission type or the reflection type, senses a sheet, the light-sensitive element 20 produces a signal 30. The mechanical switch shown in FIG. 7 is usually constituted by a microswitch 40 having a lever 40a and positioned such that 10 the lever 40a protrudes into a sheet transport path. As a sheet being transported operates the lever 40a, the switch produces a signal 50 on an ON/OFF basis.

Figure 8:
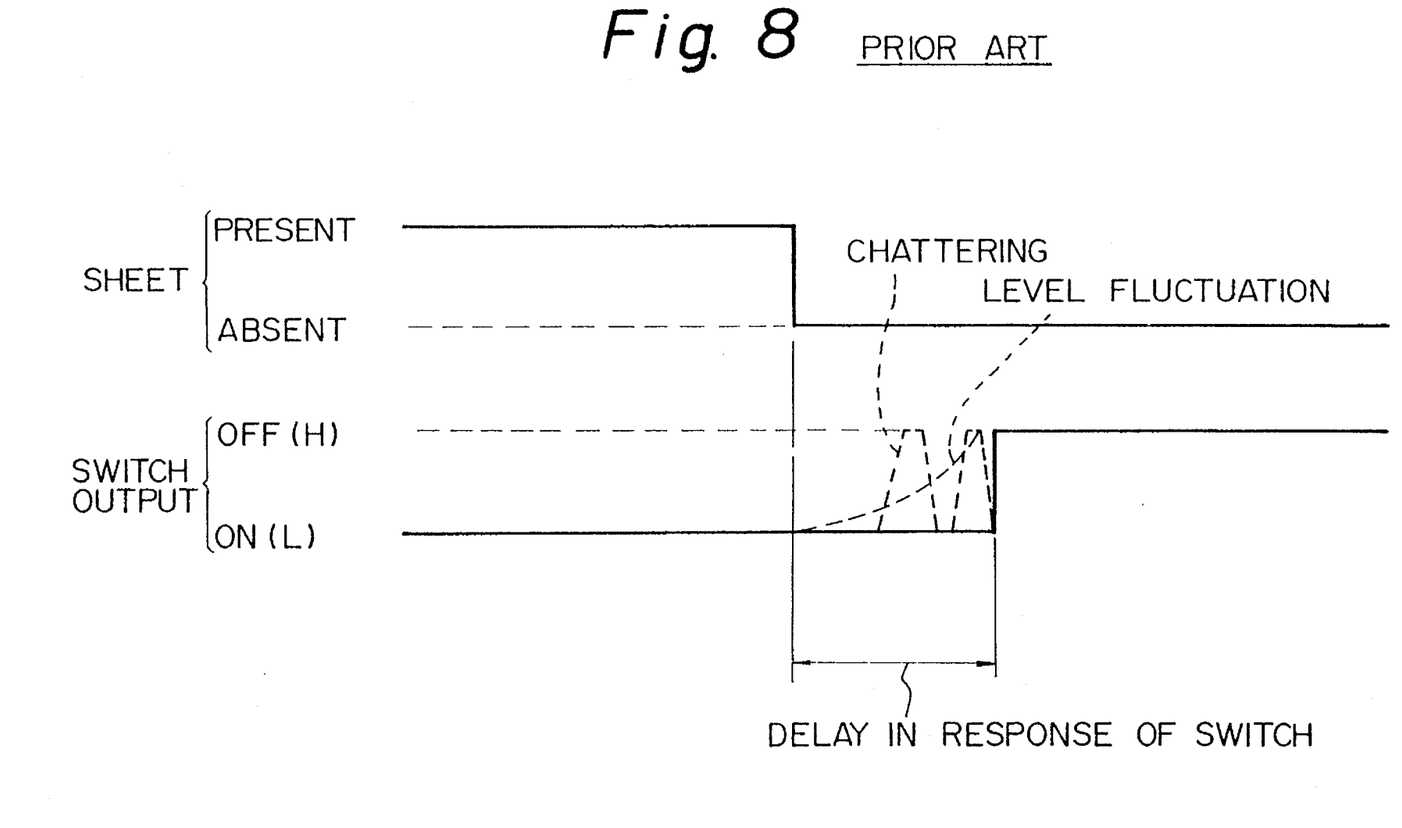
FIG. 8 is a timing charge representative of the operation of the conventional sheet sensor.

However, as shown in FIG. 8, the conventional transmission type or reflection type sensor switch causes the output level thereof to noticeably vary. As a result, the time when the sensor switch actually generates an output is deviated from the time when a sheet reaches it. Although the mechanical switch is inexpensive, the ON/OFF response thereof greatly changes due to the mechanical operation. In addition, as also shown in FIG. 8, the mechanical operation brings about chattering with the result that the time when the switch should generate a signal is delayed.

Referring to FIGS. 1–5, a print control device embodying the present invention is shown. As shown, control data for, for example, a printer is sent from a host CPU (Central Processing Unit) 101 to an interface control 102 included in the print control device. A control ROM (Read Only Memory) 103 stores programs for controlling the printer. A character generator 105 outputs a character matching a code. A head driver 108 controllably drives a print head 111. A spacing motor driver 109 controllably drives a spacing motor 112 which feeds a sheet. A line feed motor driver 110 controllably drives a line feed motor 11 for feeding the line. The reference numerals 114 and 115 designate a sheet sensor switch and an operation panel, respectively. An input/output (I/O) control 107 controls the output of signals to the drivers 108–110, the input of a signal from the sheet sensor switch 114, and the interchange of signals with the operation panel 115. A work RAM (Random Access Memory) 104 stores various kinds of data and sheet size parameters received via the interface control 102. The work RAM 104 has a line feed counter for counting the lines fed from the leading edge of a sheet in absolute value, and a sheet end counter for counting the lines fed after the end of a sheet has been detected. A CPU 106 controls the printer in conformity to the programs stored in the control ROM 103 and determines the last line to be printed on the basis of the sheet size parameters and the outputs of the above-mentioned two counters.

The sheet size parameters may be stored in the control ROM 103, if desired.

Figure 4:
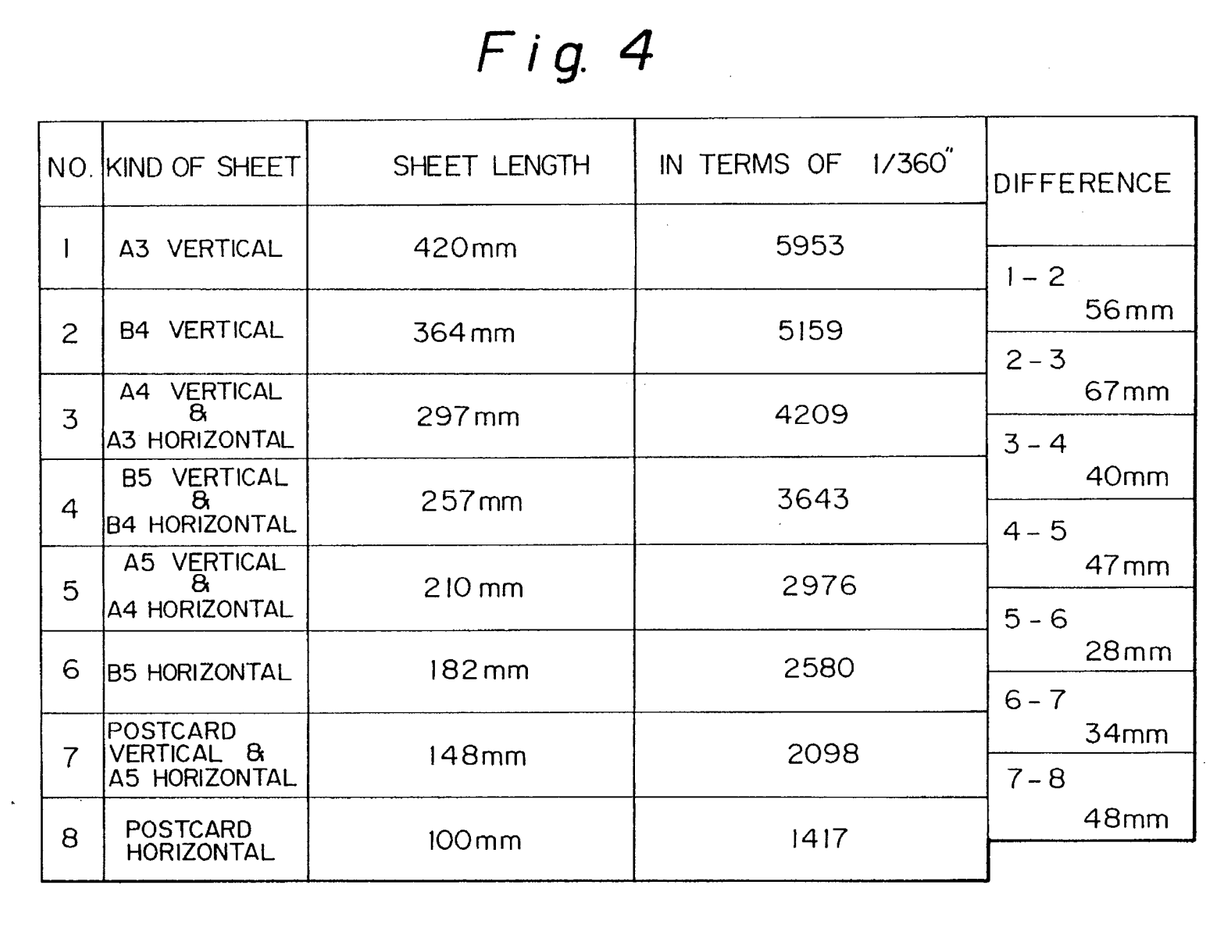
FIG. 4 lists the contents of sheet parameters.

The sheet size parameters which may be sent from the host CPU 101 or stored in the control ROM 103 are listed in FIG. 4. As shown, the parameters are (1) a sheet length of 420 millimeters and a value "5953" in terms of 1/360 inch for a size A3 in a vertical position, (2) a sheet length of 364 millimeters and a value "5159" in terms of 1/360 inch for a size B4 in a vertical position, (3) a sheet length of 297 millimeters and a value "4209" in terms of 1/360 inch for a size A4 in a vertical position and a size A4 in a horizontal position, (4) a sheet length of 257 millimeters and a value "3643" in terms of 1/360 inch for a size B5 in a vertical position and a size B4 in a horizontal position, (5) a sheet length of 210 millimeters and a value "2976" in terms of 1/360 inch for a size A5 in a vertical position and a size A4 in a horizontal position, (6) a sheet length of 182 millimeters and a value "2580" in terms of 1/360 inch for a size B5 in a horizontal position, (7) a sheet length of 148 millimeters and a value "2098" in terms of 1/360 inch for a postcard in a vertical position and a size A5 in a horizontal position, and (8) a sheet length of 100 millimeters and a value "1417" in terms of 1/360 inch for a postcard in a horizontal position. Also stored are the differences between nearby sheet lengths, i.e., a difference of 56 millimeters between "A3 VERTICAL" and "B4 VERTICAL", a difference of 67 millimeters between "B4 VERTICAL" and "A4 VERTICAL & A3 HORIZONTAL", a difference of 40 millimeters between "A4 VERTICAL & A3 HORIZONTAL" and "B5 VERTICAL & B4 HORIZONTAL", a difference of 47 millimeters between "B5 VERTICAL & B4 HORIZONTAL" and "B5 VERTICAL & B4 HORIZONTAL" and "A5 VERTICAL & A4 HORIZONTAL", a difference of 28 millimeters between "A5 VERTICAL & A4 HORIZONTAL" and "B5 HORIZONTAL", a difference of 34 millimeters between "B5 HORIZONTAL" and "POSTCARD VERTICAL & A5 HORIZONTAL", and a difference of 48 millimeters between "POSTCARD VERTICAL & A5 HORIZONTAL".

Figure 1:
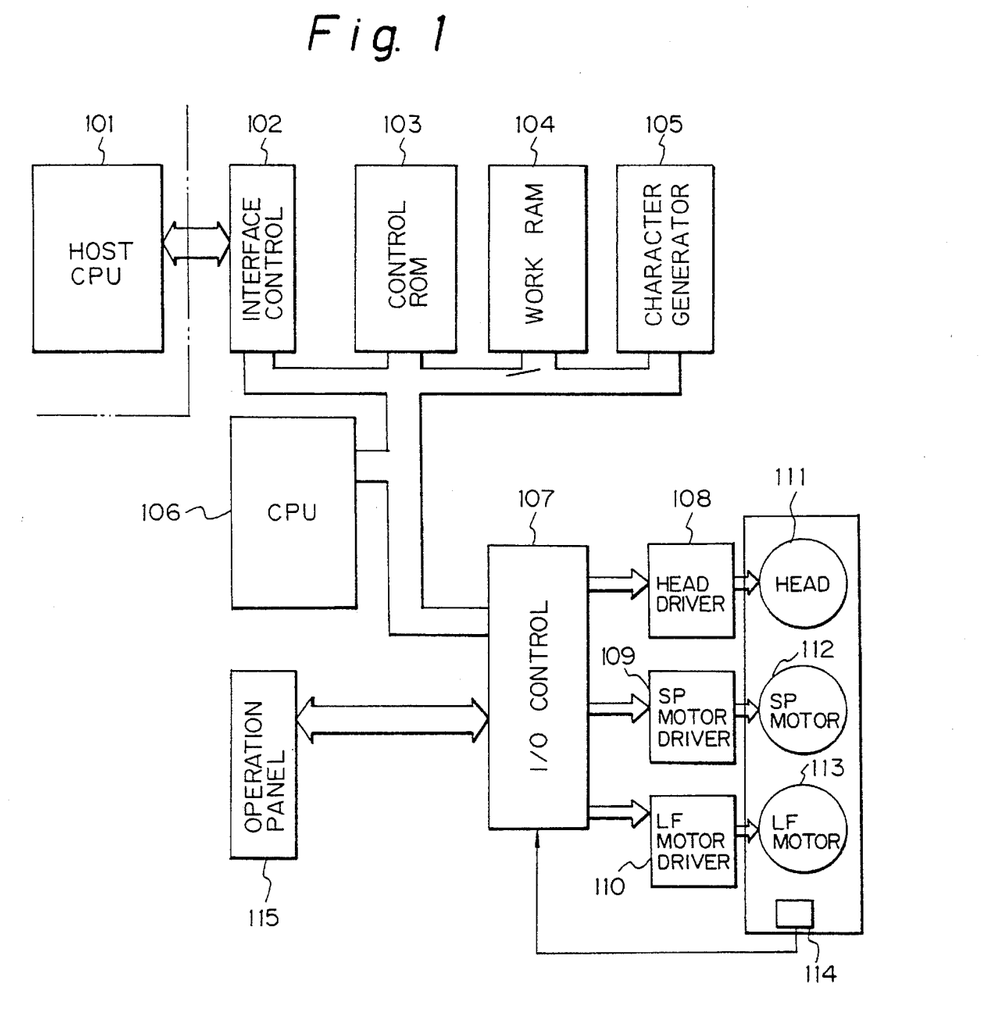
FIG. 1 is a block diagram schematically showing a print control device embodying the present invention.
Figure 2A:
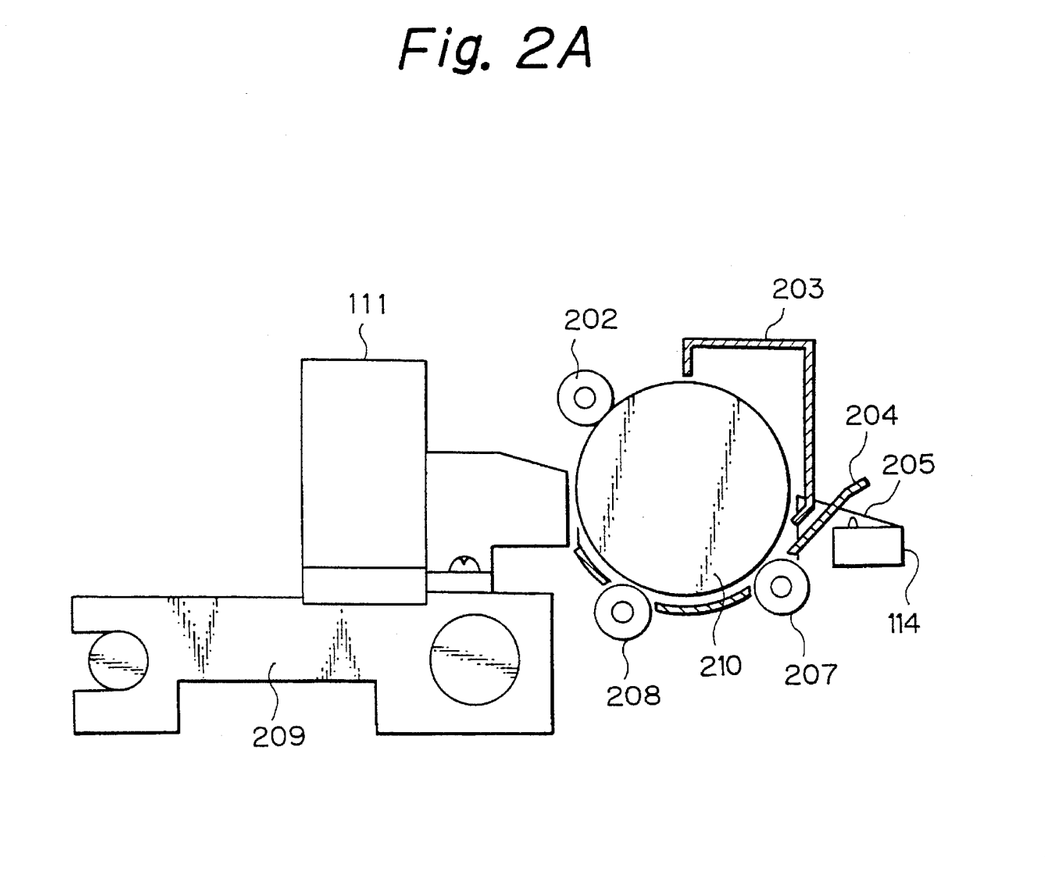
FIGS. 2A–2D show the in embodiment a sequence of operating stages.

FIG. 2A shows the mechanical arrangement of the print control device and a printer incorporating it. There are shown in the figure the print head 111, a roller 202 for feeding a sheet, the sheet sensor switch 114 implemented as a microswitch having a lever 205, a rear guide 203 and a paper guide 204 for guiding a sheet to be inserted, a first and a second pressure roller 207 and 208, respectively, for driving a sheet, a carriage 209 loaded with the head 111, and a platen 210.

The operation of the embodiment will be described specifically with reference to the figures.

Figure 2B:
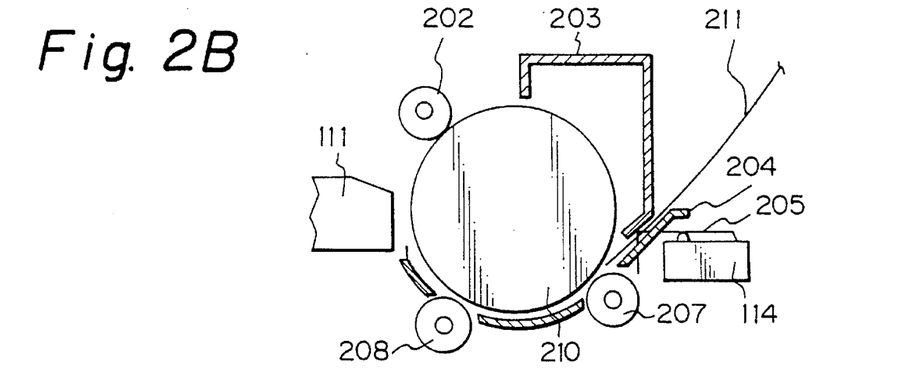
Figure 2C:
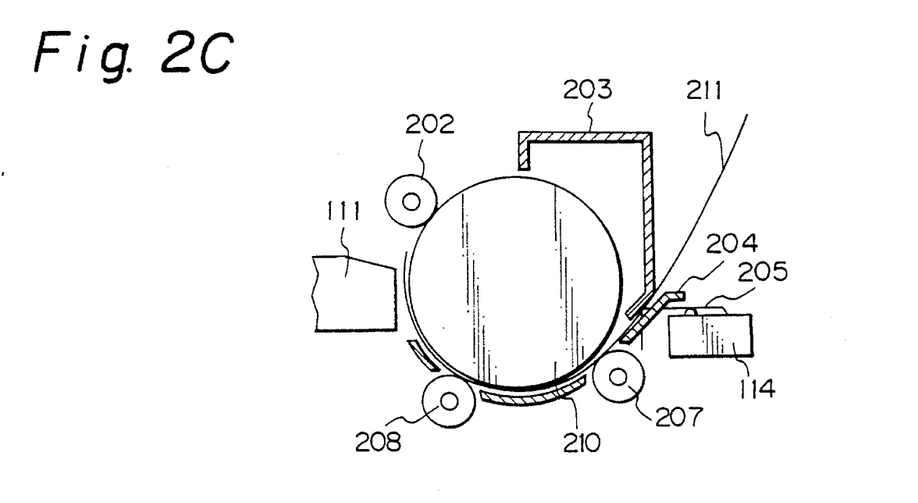

(1) As shown in FIG. 2B, a sheet 211 is inserted into an inlet formed by the rear guide 203 and paper guide 204. Then, the sheet 211 presses the lever 205 of the microswitch 114 to thereby turn on the microswitch 114. As a result, the microswitch 114 produces a signal representative of the presence of a sheet.

Figure 3:
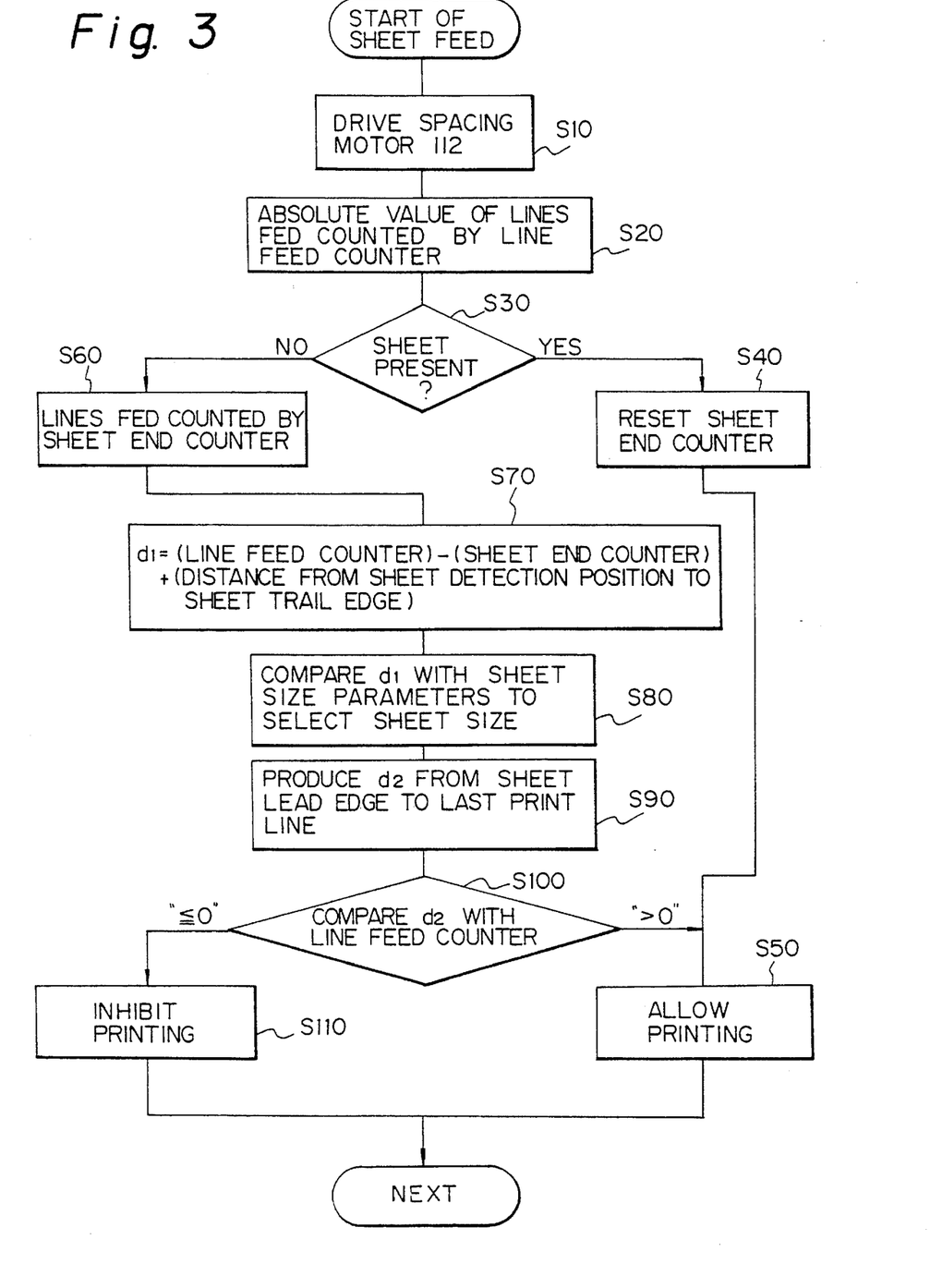
FIG. 3 is a flowchart demonstrating a specific operation of the embodiment.

(2) In response to the output of the microswitch 114, the CPU 106 controls the spacing motor driver 109 via the I/O control 107, thereby driving the spacing motor 112 (step S10, FIG. 3).

(3) After the sheet 211 has been gripped by the platen 210 and roller 207, it is transported by a predetermined amount to a position where the head 111 is to print the first line. At this instant, the number of lines fed from the leading edge to the first line of the sheet is determined by the previously mentioned line feed counter (S20, FIG. 3).

(4) The CPU 106 determines the status of the microswitch 114 (S30, FIG. 3).

(5) If the microswitch 114 is in an ON state, the CPU 106 determines that a sheet is present and resets the sheet end counter (S40, FIG. 3). Then, the CPU 106 executes processing for allowing data to be printed (S50, FIG. 3), causes the character generator 105 to transform code data to character data, and then controls the head driver 108 via the I/O control 107 to print predetermined data on the sheet 211 the head 111.

(6) In response to a line feed command, the CPU 106 controls the line feed motor driver 110 via the I/O control 107 to thereby drive the line feed motor 113.

(7) The CPU 106 increments the line feed counter by 1 (one) (S20, FIG. 3) and again checks the status of the microswitch 114 (S30, FIG. 3).

(8) If the microswitch 114 is still in the ON state, the CPU 106 repeats the above steps (5), (6) and (7).

Figure 2D:
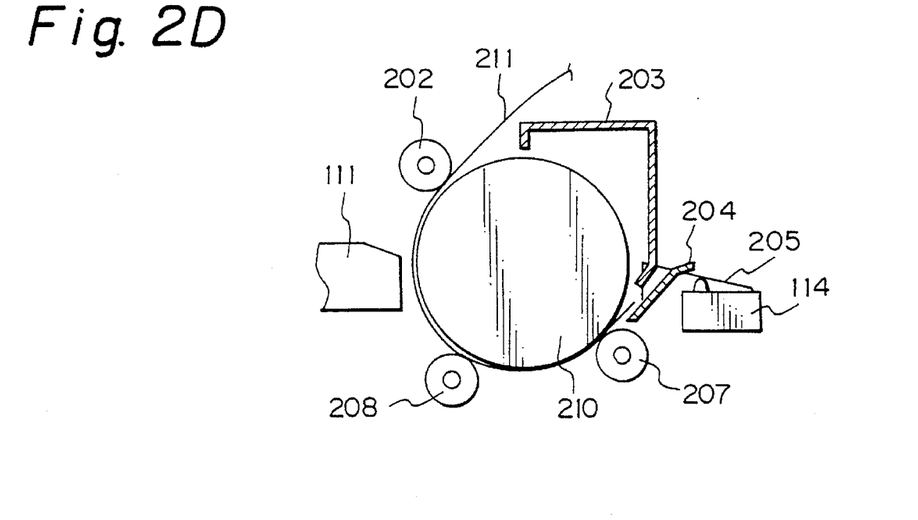

(9) As shown in FIG. 2D, as the trailing edge of the sheet 211 moves away from the lever 205 of the microswitch 114, the microswitch 114 is brought to an OFF state to show that a paper has ended.

(10) On detecting the OFF state of the microswitch 114, the CPU 106 causes the sheet end counter to count the lines fed after the detection of the end of the sheet so as to prevent the microswitch 114 from chattering (S60, FIG. 30).

(11) The CPU 106 subtracts the content of the sheet end counter from the content of the line feed counter and then adds to the residual the distance from the lever 205 of the microswitch 114 to the trailing edge of the sheet 211 to produce a value d1 (S70, FIG. 3).

Figure 5:
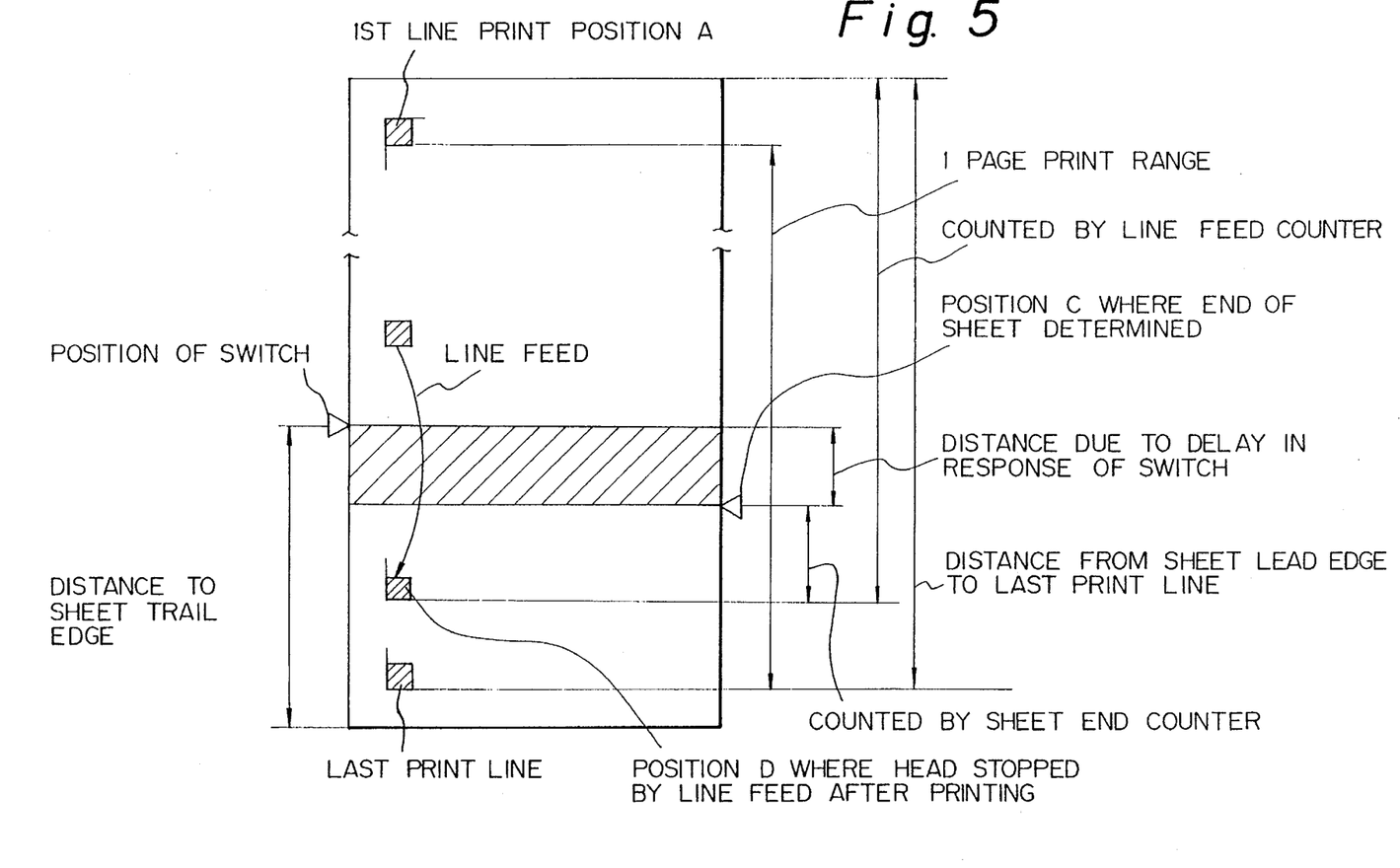
FIG. 5 shows the position of a sheet in various conditions of the embodiment.

(12) As shown in FIG. 5, the value d1 includes an error in the detection of the end of a sheet ascribable to the delay in the response of the microswitch 114. The CPU 106 compares the value d1 with the sheet parameters stored in the work RAM 104 so as to select a sheet whose parameter is closest to the value d1 (S80, FIG. 3). As tabulated in FIG. 4, the minimum difference between nearby sheet lengths is 28 millimeters. Hence, if the difference between the time when the sheet 211 has actually moved away from the lever 205 of the microswitch 114 and the time when the end of the sheet 211 has been detected is smaller than 28 millimeters in absolute value, the length of the sheet 211 being handled can be accurately determined.

(13) After determining the length of the sheet 211, the CPU 106 produces the distance d2 between the leading edge of the sheet 211 and the last printing line (S90, FIG. 3).

(14) The CPU 106 compares the distance d2 and the content of the line feed counter (S100, FIG. 3) and, if the former is greater than the latter, executes processing for allowing printing (S50, FIG. 3). If otherwise, the CPU 106 executes processing for inhibiting printing to thereby interrupt printing (S110, FIG. 3).

By the above procedure, it is possible to print data on a sheet while confining them in the predetermined printing range of one page without excess or deficiency.

In summary, it will be seen that the present invention provides a print control device capable of detecting the last printing line with no regard to the type of a sheet sensor, the color, thickness and hardness of a sheet, or the sheet feed speed. With such a device, it is possible to maintain the absolute printing amount of a cut sheet without resorting to the adjustment of the position of a sheet sensor or the adjustment of circuit constants. In addition, the device of the invention is low cost.

Various modifications will become possible for those skilled in the art after receiving the teachings of the present disclosure without departing from the scope thereof.

What is claimed is:

1. A print control device for a printer which prints data on a sheet with a print head and comprises a host CPU (Central Processing Unit), an interface control for controlling reception of data sent from said host CPU, a control ROM (Read Only Memory) for storing programs for controlling said printer, a head driver for driving said print head, a spacing motor driver for driving a spacing motor for feeding the sheet, a line feed motor driver for driving a line feed motor for feeding a line, switch means for sensing the sheet, and an input/output control for controlling output of signals to said drivers and input of signals from said switch means, said print control device comprising:

a work RAM (Random Access Memory) for storing various kinds of data and sheet size parameters received via the interface control, said work RAM comprising a line feed counter for counting an absolute value of lines fed from a leading edge of the sheet to produce a line feed count, and a sheet end counter for counting lines fed after a trailing edge of the sheet has been detected to produce a sheet end count; and calculating means for calculating a last printing line of the sheet on the basis of the sheet size parameters, the line feed count and the sheet end count while controlling the printer according to the programs stored in the control ROM, thereby to determine the sheet size during printing of data on the sheet in response to detection of the trailing edge of the sheet by said switch means.

2. A device as claimed in claim 1, wherein said calculating means comprises a CPU.

* * * * *